United States Patent [19]
Cain, Jr. et al.

[11] Patent Number: 4,629,508
[45] Date of Patent: Dec. 16, 1986

[54] PROCESS FOR FORMING HYDRATED CALCIUM SILICATE PRODUCTS

[75] Inventors: Clifford W. Cain, Jr., Bailey; Phillip C. Martin, Conifer; Steven R. Martinez, Denver, all of Colo.

[73] Assignee: Manville Corporation, Denver, Colo.

[21] Appl. No.: 840,341

[22] Filed: Mar. 17, 1986

[51] Int. Cl.$^4$ ............... C04B 7/00; C04B 2/02; C04B 7/34; C01B 33/24

[52] U.S. Cl. ................... 106/85; 106/98; 106/120; 106/DIG. 2; 423/331; 252/378 P

[58] Field of Search ............ 106/DIG. 2, 98, 120, 106/85; 252/378 R, 378 P; 423/331

[56] References Cited

U.S. PATENT DOCUMENTS

| | | | |
|---|---|---|---|
| 2,517,235 | 8/1950 | Pierce | 106/DIG. 2 |
| 2,858,227 | 10/1958 | Rodsky | 106/DIG. 2 |
| 3,873,351 | 3/1975 | Ueda | 106/94 |
| 3,902,913 | 9/1975 | Hetser et al. | 106/119 |
| 3,988,419 | 10/1976 | Mori | 423/331 |

FOREIGN PATENT DOCUMENTS 3314145 10/1984 Fed. Rep. of Germany ... 106/DIG. 2

*Primary Examiner*—Gary P. Straub
*Attorney, Agent, or Firm*—John D. Lister; Cornelius P. Quinn; Gregory A. Evearitt

[57] ABSTRACT

A process is described for the formation of shaped hydrated calcium silicate products. The process comprises reacting an aqueous slurry containing a source of calcium hydroxide, perlite as a source of silica, and a soluble calcium salt in the presence of high pressure saturated steam, then adding cooling water followed by subsequent venting of the reactor vessel to ambient pressure. Reinforcing fibers may then be added after which the desired shapes are molded and dried.

8 Claims, No Drawings

PROCESS FOR FORMING HYDRATED CALCIUM SILICATE PRODUCTS

FIELD OF THE INVENTION

This invention relates to a process for the production of shaped articles formed from calcium silicate slurries.

BACKGROUND OF THE INVENTION

Shaped calcium silicate products are widely used, particularly as insulation materials in the building industry. These products are commonly formed by combining a source of calcium oxide with a siliceous material. On heating this mixture in an autoclave, a variety of crystalline forms of calcium silicate may be formed, depending upon the temperature, pressure, length of reaction time, and water concentration used. The reaction product of this process is generally an aqueous slurry of hydrated calcium silicate crystals. Reinforcing fibers such as glass and polyester fibers may then be added to the slurry. This slurry is then cast into molds and is dried, usually by the application of heat, to form the desired finished shaped objects.

It has been considered impractical by those in the industry to utilize any source of silica in the reaction which was not of extremely high purity. This is because it was believed and found that if a non-high purity source of silica was used, for some reason the calcium silicate hydrothermal reaction was greatly accelerated and the resulting reaction slurry was not easily moldable into shaped products because of poor filtration characteristics and poor calcium silicate crystal agglomerate formation.

It would be desirable, however, to be able to utilize non-high purity sources of silica in the reaction because of their ready availability and relatively cheap cost.

BRIEF SUMMARY OF THE INVENTION

Applicants have now discovered that if soluble calcium salts are added to the calcium silicate reaction, perlite may be utilized as a source of silica in the reaction. So far as Applicants are aware, none of the prior art processes for the formation of shaped hydrated calcium silicate products have employed perlite and soluble calcium salts in the reaction.

The processes of this invention involves first forming an aqueous slurry comprising a source of calcium hydroxide, perlite, and a soluble calcium salt. The slurry is then heated in a pressure vessel in the presence of saturated steam at a pressure of at least 75 psig to form hydrated calcium silicate crystals. Following formation of the desired crystalline calcium silicate hydrate, the steam input is halted and low temperature water is gradually added to the reaction mixture within the pressure vessel in an amount approximately equal to the steam that will be lost in subsequent venting of the reactor to approximately atmospheric pressure. After the cooling water is added, the steam is then gradually vented from the reactor to reduce the pressure within the reaction vessel to approximately atmospheric pressure. The slurry is then removed from the vessel and, if desired, non-asbestos fibrous reinforcement agents are added. The slurry is then formed into the desired shape and dried.

Other features and aspects, as well as the various benefits of the invention will be made clear in the more detailed description which follows and the appended claims.

DETAILED DESCRIPTION OF THE INVENTION

The hydrothermal crystallization step of this invention is conducted in a suitable pressure vessel such as an autoclave with provision for agitating the slurry. The slurry containing the source of calcium hydroxide, the perlite, and the soluble calcium salt is placed in the autoclave and heated by high pressure saturated steam. The steam pressure is generally within the range of from 75 to 500 psig, preferably 100–250 psig; the temperature will be that of the saturated steam at the particular pressure (thus over this particular pressure range, the temperature will range from about 321° F. to about 470° F.). The particular pressure and associated temperature which are used will be determined by the predominant type of calcium silicate hydrate crystal which is desired. The time of reaction at the operating temperature will also be determined by the type of crystal form of the calcium silicate hydrate desired. Normally, the reaction time will be between 0.5 and 20 hours, preferably 2–8 hours. The particular hydrothermal reaction conditions which favor the formation of one crystalline type over another are known to those skilled in the art.

It has been found that the addition of soluble calcium salts, preferably gypsum, and most preferably plaster of paris, to the reaction mixture allows perlite to be advantageously used as the source of silica. As used herein, the term "soluble calcium salts" includes calcium salts which are only slightly soluble (e.g. plaster of paris) and those which are highly soluble (e.g. $CaCl_2$) in water as well as those with intermediate solubilities. Although not meant to be bound by theory for purposes of patentability of the present invention, it is believed that the addition of the calcium salt helps to tie up the sodium and potassium silicates normally present in the perlite which probably accelerate the crystalline calcium silicate reaction. This increased rate of reaction adversely affects the slurry filtration rate, the surface area, and the agglomerate structure of the slurry. The calcium salts serve to slow down the reaction rate and result in the formation of strong agglomerates that produce a good moldable product.

The slurry which contains the source of calcium hydroxide, the perlite, and the soluble calcium salt will have a water:solids weight in range of from 4:1 to 10:1, preferably 5:1 to 7:1. Normally the amount of water present will be no more than that sufficient to permit an adequate dispersion of the solid materials and to permit proper growth of the crystal agglomerates during the hydrothermal reaction. During the hydrothermal reaction, steam condenses to provide some dilution of the slurry. The reacted slurry will have a water:solids weight ratio in the range of from 6:1 to 12:1.

During the crystallization step, the slurry will be agitated or stirred at least part of the time. It is preferred that the agitation be moderate and constant during the crystallization step although if desired, periodic agitation can be used. In the latter case, it is preferred that the agitation be during the early portion of the crystallization step, and followed by a period of quiescence. Agitation may be by any conventional means, such as paddles, bladed mixers, and the like. The degree of agitation should be such that thorough mixing of the reactants is obtained but crystal agglomerates are not excessively broken down. Operation of conventional agitating devices in an optium manner under these conditions is well within the ability of those skilled in the art of mixing and need not be further detailed here.

Following completion of the crystallization step, the supply of saturated steam to the pressure vessel is stopped. The phrase "completion of the crystallization step" as used herein refers to that point at which essentially all of the desired quantity of the desired type of crystals have been obtained in the slurry. It is recognized that crystal growth does not halt instantly and that some crystal growth will continue during the cooling and water addition phase of the process. However, the amount of crystals so formed does not represent a significant addition to the crystals already present and therefore, for practical purposes, crystallization can be considered to have been completed at the time the steam is shut off and the water addition begun.

The water addition is accomplished by any convenient means. Normally this will be by a piping arrangement which permits addition of cool water to the hot aqueous slurry. Alternatively or additionally, water can be introduced into the pressure vessel by means of spraying devices within the pressure vessel. In any event, introduction of the water cools and dilutes the slurry, while simultaneously reducing the internal pressure in the vessel by condensing the steam.

The amount of water which is added to the slurry is principally for replacing the amount of steam that will be lost during the subsequent process of venting the reactor to approximately atmospheric (i.e. ambient) temperature. The amount of water which will be needed can be calculated in advance of the subsequent reactor venting step by reference to published steam tables readily available in standard chemical engineering handbooks. Such a calculation is routine to and readily within the knowledge of those skilled in the art.

After the addition of the water is complete, stem is vented from the top of the reaction vessel to adjust the pressure within the vessel to approximately ambient pressure. "Approximate ambient pressure" as used herein means a pressure not exceeding 50 psig, but preferably not exceeding 20 psig.

The water:solids weight ratio of the reacted slurry which is taken from the pressure vessel following water addition and cooling and steam venting will be about 6:1 to 12:1, preferably 9:1 to 11:1. The particular concentration will be that most amenable to the specific molding and drying steps which follow.

Following the attendant temperature and pressure reduction, the slurry is removed from the pressure vessel and formed into the desired finished product, usually by molding and drying. If desired, non-asbestos fibrous reinforcement may be added prior to molding. The slurry of calcium silicate hydrate and any non-asbestos fibrous reinforcement can be molded readily into any desired shape by the conventional shaping processes such as compression molding, extrusion molding, casting, shaping with filter press or wet machine, etc. The molded shape may be dried simply by allowing the shape to stand under ambient conditions. Alternatively, the molded shape may be heated in a drying atmosphere if faster drying is desired.

The source of calcium hydroxide of the invention may be any of the common calcareous materials such as quicklime, slaked lime, acetylene residuum, carbide residuum, etc.

Generally, the perlite employed should be at least 65% by weight $SiO_2$ and contain no more than 10 wt % combined of $Na_2O$ and $K_2O$, and preferably no more than 8 wt % combined.

Any soluble or slightly soluble calcium salt may be utilized in the present invention such as hydrated or unhydrated calcium sulfate, calcium nitrate, calcium chloride, calcium acetate and the like. $CaSO_4 \cdot \frac{1}{2}H_2O$ (plaster of paris) is preferred.

The mole ratio of calcium hydroxide:silica will generally range from about 0.5:1 to 3.0:1 depending upon the particular crystalline hydrate desired. The mole ratio will preferably be in the range of approximately 0.6:1 to 0.85:1.

The mole ratio in the prereaction mixture of the soluble calcium salt to the total amount of sodium and potassium oxides present in the perlite will generally be in the range of about 0.5:1 to 1.2:1, preferably about 0.7:1 to 0.95:1.

The non-asbestos fibrous reinforcement may be inorganic or organic fibrous materials. Examples of inorganic materials include glass fibers and rockwool. Examples of organic materials include polyester fibers, natural cellulosic fibers and synthetic fibrous materials such as rayons and nylons.

The shaped products formed from the process of this invention may be used directly as obtained following the drying step. They may also, if desired, be coated, painted or otherwise durther prepared for their ultimate uses.

The following example further illustrates but does limit the present invention.

EXAMPLE

To 1500 gallons of water heated in a premixer to 140° F. were added 1132 pounds of quicklime, 2308 lbs of perlite and 250 pounds of plaster of paris. These were thoroughly blended to form a prereaction slurry having a water:solids weight ratio of 3.39:1. The slurry was charged to a 5000 gallon reactor vessel followed by 1500 gallons of flush water. The reaction vessel was agitated at a speed of 10 rpm and the slurried ingredients were reacted together at a minimum steam pressure of about 175 psi for about 3.5 hours to form agglomerated hydrated calcium silicate crystals. At the end of the reaction time the steam supply was shut off and approximately 687 gallons of water were added to the reacted slurry within the reactor (pressure) vessel at the rate of about 100 gallons per minute through four sparger nozzles located within the reactor vessel at 90 degree angles to each other. The reaction vessel was agitated at 10 rpm for the duration of the injected period. Following addition of the water, the reactor vessel was steam vented for about 40 minutes to approximately ambient pressure (i.e. 20 psi) and the resulting temperature within the vessel was about 250° F. The reaction slurry containing the agglomerated hydrated calcium silicate crystals was then transported from the reactor vessel through a heat exchanger wherein the temperature of the slurry was reduced to about 180° F.–185° F. 41 pounds polyester fiber, 35 pounds chopped glass fiber, and 25 pounds phlogopite mica were then added to the slurry along with 1000 gallons of dilution water and the ingredients were then thoroughly dispersed. The slurry was then molded under the pressure in a molding block to insulation of desired thickness of varying periods of time depending upon the thickness of the final insulation product.

In the above reaction, the mole ratio of $CaO/SiO_2$ in the prereaction slurry was 0.7:1 and the mole ratio of plaster of paris to CaO in the prereaction slurry was 0.09:1.

The source of perlite utilized contained about 73 wt % $SiO_2$, 3.43 wt % $Na_2O$, and 4.57 wt % $K_2O$ and was ground to an average particle size of 4.0 to 4.5 microns as measured per Fisher sub-sieve sizer analysis.

In the foregoing example, the inventive process resulted in the formation of strong crystal agglomerates which were easily molded into a strong product. The products of this invention have average densities in the range of 13 to 16 lbs/ft$^3$, and modulus of rupture (dry) on the order of 70 psi. Thermal conductivity at 700° F. mean temperature is on the order of 0.65 BTU-in/hr-ft$^2$-°F. These values compare favorably with, and in some cases exceed, the corresponding values for hydrated calcium silicate materials formed by prior art processes. The process of this invention, therefore, is capable of producing satisfactory (in some cases superior) calcium silicate materials for insulation and other uses while yet avoiding certain of the disadvantages of the prior art processes. Most notably, perlite can now be used as a source of silica with no adverse affect upon the product quality.

The above description details the invention and sets forth illustrative examples of materials and embodiments of the invention. It will be immediately apparent to those skilled in the art, or will become so upon practice of the invention, that there are numerous other embodiments clearly within the scope and spirit of this invention as defined in the claims.

We claim:
1. A process for the formation of shaped hydrated calcium silicate objects which comprises the steps of:
  (a) forming an aqueous slurry comprising perlite, a calcium salt, selected from the group of consisting of hydrated and unhydrated calcium sulfate, calcium nitrate, calcium chloride and calcium acetate and a source of calcium hydroxide wherein: (i) said source of calcium hydroxide is one selected from the group consisting of quicklime, slaked lime, acetylene residuum and carbide residuum; (ii) the mole ratio of calcium hydroxide to silica provided by said perlite in said slurry is in the range of 0.5:1 to 3.0:1; and (iii) the mole ratio of said calcium salt to the total amount of potassium and sodium oxides present in the perlite is in the range of about 0.5:1 to 1.2:1;
  (b) heating said slurry in a pressure vessel in the presence of saturated steam at a pressure of at least 75 psig for a period of at least one-half hour to form agglomerates of hydrated calcium silicate crystals;
  (c) adding water in every instance to the slurry containing said agglomerates of hydrated calcium silicate crystals in said pressure vessel in an amount sufficient to replace the calculated amount of steam to be lost during the subsequent venting of the pressure vessel in step 1(d);
  (d) venting the steam pressure vessel after said addition of water is complete to gradually reduce the steam pressure within the vessel to a pressure not exceeding 50 psig;
  (e) removing the slurry from said vessel; and
  (f) forming said slurry into the desired shape and then drying it to obtain said shaped objects.

2. The process of claim 1 wherein non-asbestos fibrous material is incorporated into the slurry following step (a) and prior to step (f).

3. The process of claim 1 wherein said said calcium salt is gypsum.

4. The process of claim 1 wherein said said calcium salt is plaster of paris.

5. The process of claim 1 wherein said saturated steam is maintained in step (b) at a pressure in the range of 75–500 psig.

6. The process of claim 1 wherein step (b) is continued for a period of time in the range of 0.5–2.0 hours.

7. The process of claim 1 wherein said slurry in 1(a) has a water:solids weight ratio in the range of 4:1 to 10:1.

8. The process of claim 1 wherein said slurry in 1(c) after water addition has a water:solids weight ratio in the range of 6:1 to 12:1.

* * * * *